US012720433B2

(12) United States Patent
Xu et al.

(10) Patent No.: US 12,720,433 B2
(45) Date of Patent: Aug. 25, 2026

(54) SWITCHING METHOD, TERMINAL DEVICE, NETWORK DEVICE, AND COMMUNICATION SYSTEM

(71) Applicant: GUANGDONG OPPO MOBILE TELECOMMUNICATIONS CORP., LTD., Dongguan (CN)

(72) Inventors: Weijie Xu, Dongguan (CN); Cong Shi, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 428 days.

(21) Appl. No.: 17/854,117

(22) Filed: Jun. 30, 2022

(65) Prior Publication Data

US 2022/0338123 A1 Oct. 20, 2022

Related U.S. Application Data

(63) Continuation of application No. PCT/CN2019/130534, filed on Dec. 31, 2019.

(51) Int. Cl.
*H04W 52/00* (2009.01)
*H04W 48/12* (2009.01)
(Continued)

(52) U.S. Cl.
CPC ....... *H04W 52/0235* (2013.01); *H04W 48/12* (2013.01); *H04W 72/23* (2023.01); *H04W 88/06* (2013.01)

(58) Field of Classification Search
CPC . H04W 52/0235; H04W 48/12; H04W 72/23; H04W 88/06; H04W 52/0216;
(Continued)

(56) References Cited

U.S. PATENT DOCUMENTS

2018/0288715 A1* 10/2018 Ye .......................... H04L 5/005
2019/0313437 A1 10/2019 Jung et al.
(Continued)

FOREIGN PATENT DOCUMENTS

CN 110519853 A 11/2019
CN 112399594 A * 2/2021
(Continued)

OTHER PUBLICATIONS

Extended European Search Report issued in corresponding European application No. 19958301.4, mailed Oct. 28, 2022.
(Continued)

*Primary Examiner* — Brandon M Renner
(74) *Attorney, Agent, or Firm* — BAYES PLLC

(57) ABSTRACT

The present disclosure relates to a switching method, a terminal device, a network device, and a communication system, allowing terminal devices to switch between channel monitoring configurations in a flexible manner. The method comprises: a terminal device receiving switching information, the switching information being used to instruct the terminal device to switch between monitoring configurations for a channel; and the terminal device switching between monitoring configurations for the channel.

19 Claims, 6 Drawing Sheets

(51) Int. Cl.
*H04W 52/02* (2009.01)
*H04W 72/23* (2023.01)
*H04W 88/06* (2009.01)

(58) Field of Classification Search
CPC ......... H04W 72/0453; H04W 52/0219; H04W 24/08; H04W 72/0457; H04W 72/232; H04L 1/0046; H04L 27/26025; H04L 5/0053; H04L 27/2602; H04L 5/0094; H04L 1/0038; H04L 5/001; H04L 5/0096; H04B 7/0802; Y02D 30/70
See application file for complete search history.

(56) References Cited

U.S. PATENT DOCUMENTS

| | | | | |
|---|---|---|---|---|
| 2020/0084705 | A1* | 3/2020 | Xu | H04W 24/08 |
| 2020/0112917 | A1* | 4/2020 | Nam | H04W 52/024 |
| 2020/0119893 | A1* | 4/2020 | Zhang | H04W 72/0446 |
| 2020/0296700 | A1* | 9/2020 | Park | H04W 24/10 |
| 2021/0314866 | A1* | 10/2021 | Lee | H04W 76/28 |
| 2022/0070679 | A1* | 3/2022 | Harada | H04W 16/14 |

FOREIGN PATENT DOCUMENTS

| | | | | |
|---|---|---|---|---|
| WO | 2018171520 | A1 | 9/2018 | |
| WO | 2019053291 | A1 | 3/2019 | |
| WO | 2019056390 | A1 | 3/2019 | |
| WO | WO-2019160720 | A1 * | 8/2019 | H04W 24/02 |

OTHER PUBLICATIONS

CMCC, “Discussion on UE power saving schemes with adaption to UE traffic”, R1-1900421, 3GPP TSG RAN WG1 Ad-Hoc Meeting 1901 Taipei, Jan. 21-25, 2019.
Samsung, “On UE adaptation Schemes”, R1-1902318, 3GPP TSG RAN WG1 RAN1 Meeting #96 Athens, Greece, Mar. 25-1, 2019.
Huawei et al., “Procedure of cross-slot scheduling for UE power saving”, R1-1908070, 3GPP TSG RAN WG1 Meeting #98 Prague, Czech Republic, Aug. 26-30, 2019.
First Office Action issued in corresponding European application No. 19958301.4, mailed Aug. 14, 2023.
Second Office Action issued in corresponding Chinese application No. 202210901352.9, mailed Sep. 22, 2023.
Decision of Rejection issued in corresponding Chinese application No. 202210901352.9, mailed Jan. 2, 2024.
Second Office Action issued in corresponding European application No. 19958301.4, mailed Feb. 5, 2024.
“Discussion on PDCCH-based power saving channel”, Source: Spreadtrum Communications, 3GPP TSG RAN WG1 Meeting #98bis, R1-1910013, Chongqing, China, Oct. 14-20, 2019, 16 pages.
“Discussion on PDCCH-based power saving channel”, Source: Spreadtrum Communications, 3GPP TSG RAN WG1 Meeting #99, R1-1912573, Reno, USA, Nov. 18-22, 2019, 15 pages.
“CMAS/ETWS Reception at UE Configured with eDRX”, Source: Apple, 3GPP TSG-RAN WG2 Meeting #107bis, R2-1913382, Chongqing, China, Oct. 14-18, 2019, 3 pages.
International Search Report dated Jul. 14, 2020 from the International Searching Authority Re. Application No. PCT/CN2019/130534, 6 pages.
Written Opinion dated Jul. 14, 2020 from the International Searching Authority Re. Application No. PCT/CN2019/130534, 9 pages.
“Feature lead summary #3 for NR-U DL Signals and Channels”, Source: Motorola Mobility, Lenovo, 3GPP TSG RAN WG1#99, R1-1913501, Reno, United States, Nov. 18-22, 2019, 36 pages.
“Further considerations on cross-slot scheduling for power saving”, Source: Oppo, 3GPP TSG RAN WG1 #99, R1-1912649, Reno, USA, Nov. 18-22, 2019, 7 pages.
“New WID on NR Dynamic spectrum sharing (DSS)”, Source: Ericsson, 3GPP TSG RAN Meeting #86, RP-193230, Sitges, Spain, Dec. 9-12, 2019, 3 pages.
“New WID: UE Power Saving Enhancements”, Source: MediaTek Inc., 3GPP TSG RAN Meeting #86, RP-193239 (revision of RP-193173), Sitges, Spain, Dec. 9-12, 2019, 5 pages.
First Office Action issued in corresponding Chinese application No. 202210901352.9, mailed Jun. 30, 2023.

* cited by examiner

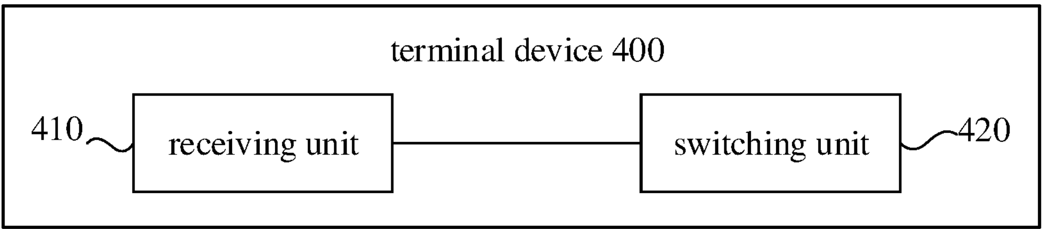
FIG. 5
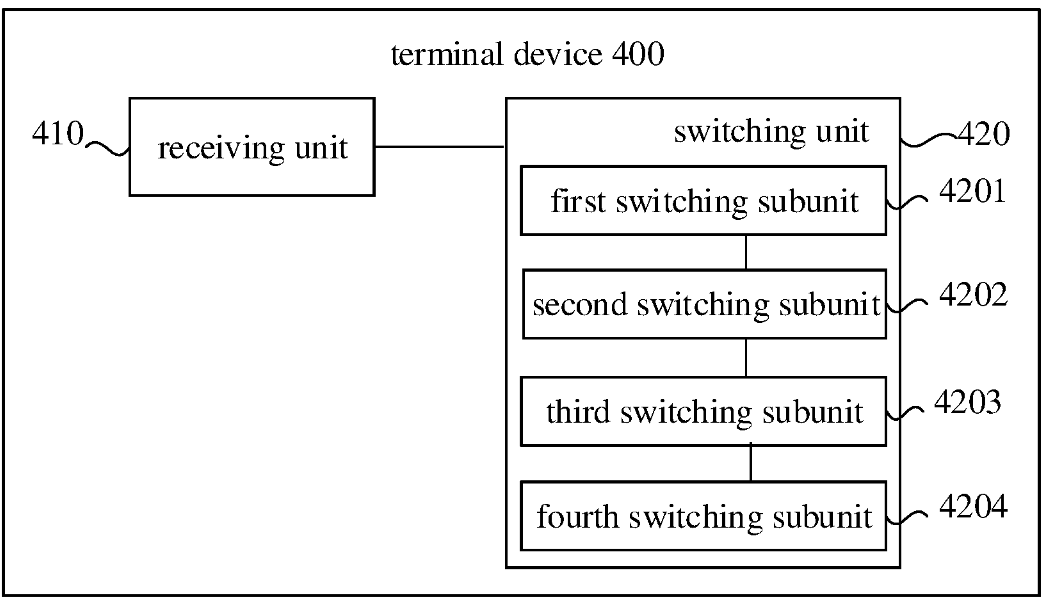
FIG. 6
terminal device 400
410
receiving unit
switching unit
420
first switching subunit
4201
second switching subunit
4202
third switching subunit
4203
fourth switching subunit
4204
FIG. 7
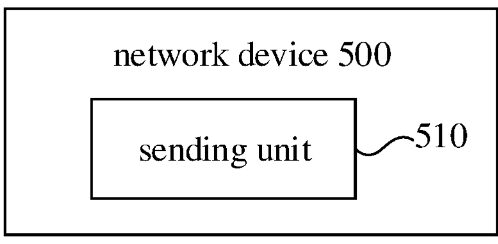
FIG. 8

SWITCHING METHOD, TERMINAL DEVICE, NETWORK DEVICE, AND COMMUNICATION SYSTEM

CROSS REFERENCE TO RELATED APPLICATIONS

The present application is a continuation of International Application No. PCT/CN2019/130534, filed on Dec. 31, 2019, the content of which is incorporated herein by reference in its entirety.

TECHNICAL FIELD

The present disclosure relates to the field of communication, and more particularly, to a switching method, a terminal device, a network device and a communication system.

BACKGROUND

In order to save energy of a terminal device, a communication system supports a Discontinuous Reception (DRX) transmission mechanism. DRX is a discontinuous signal reception in a time domain through a semi-static configuration. In this way, a monitoring period of a control channel of the terminal device can only be changed after a long period of semi-static reconfiguration. A DRX enhanced mechanism supported in a 5th-Generation (5G) evolution project is cross-slot scheduling. In this way, inconsistent parsing of the terminal device and a network device may occur. Therefore, there is a need for a better channel monitoring scheme.

SUMMARY

Embodiments of the present disclosure provide a switching method, a terminal device, a network device, and a communication system, which can enable the terminal device to switch a channel monitoring mode more flexibly.

Embodiments of the present disclosure provide a switching method, including: receiving, by a terminal device, switching information, wherein the switching information is used for instructing the terminal device to switch a channel monitoring mode; and switching, by the terminal device, the channel monitoring mode.

Embodiments of the present disclosure provide a switching method, including: sending, by a network device, switching information, wherein the switching information is used for instructing a terminal device to switch a channel monitoring mode.

Embodiments of the present disclosure provide a terminal device, including: a receiving unit, configured to receive switching information, wherein the switching information is used for instructing the terminal device to switch a channel monitoring mode; and a switching unit, configured to switch the channel monitoring mode.

Embodiments of the present disclosure provide a network device, including: a sending unit, configured to send switching information, wherein the switching information is used for instructing a terminal device to switch a channel monitoring mode.

Embodiments of the present disclosure provide a terminal device, including a processor and a memory. The memory is configured to store a computer program, and the processor is configured to call and run the computer program stored in the memory to execute the above switching method.

Embodiments of the present disclosure provide a network device including a processor and a memory. The memory is configured to store a computer program, and the processor is configured to call and run the computer program stored in the memory to execute the above switching method.

Embodiments of the present disclosure provide a communication system, including: a terminal device, configured to execute corresponding functions implemented by the terminal device in the switching method provided in embodiments of the present disclosure; and a network device, configured to execute corresponding functions implemented by the network device in the switching method provided in embodiments of the present disclosure.

Embodiments of the present disclosure provide a chip, to perform the above switching method.

Specifically, the chip includes: a processor, configured to call and run a computer program from a memory, so that a device installed with the chip performs the above switching method.

Embodiments of the present disclosure provide a computer-readable storage medium, configured to store a computer program that causes a computer to perform the above switching method.

Embodiments of the present disclosure provide a computer program product, including computer program instructions, which cause the computer to perform the above switching method.

Embodiments of the present disclosure provide a computer program which, when run on a computer, causes the computer to perform the above switching method.

In some embodiments of the present disclosure, the terminal device is instructed to switch the channel monitoring mode through the switching information, so that the terminal device can switch the channel monitoring mode more flexibly.

BRIEF DESCRIPTION OF THE DRAWINGS

FIG. 5 is a schematic flowchart of a switching method according to another embodiment of the present disclosure.

FIG. 6 is a schematic block diagram of a terminal device according to an embodiment of the present disclosure.

FIG. 7 is a schematic block diagram of a terminal device according to another embodiment of the present disclosure.

FIG. 8 is a schematic block diagram of a network device according to an embodiment of the present disclosure.

DETAILED DESCRIPTION

Figure 1:
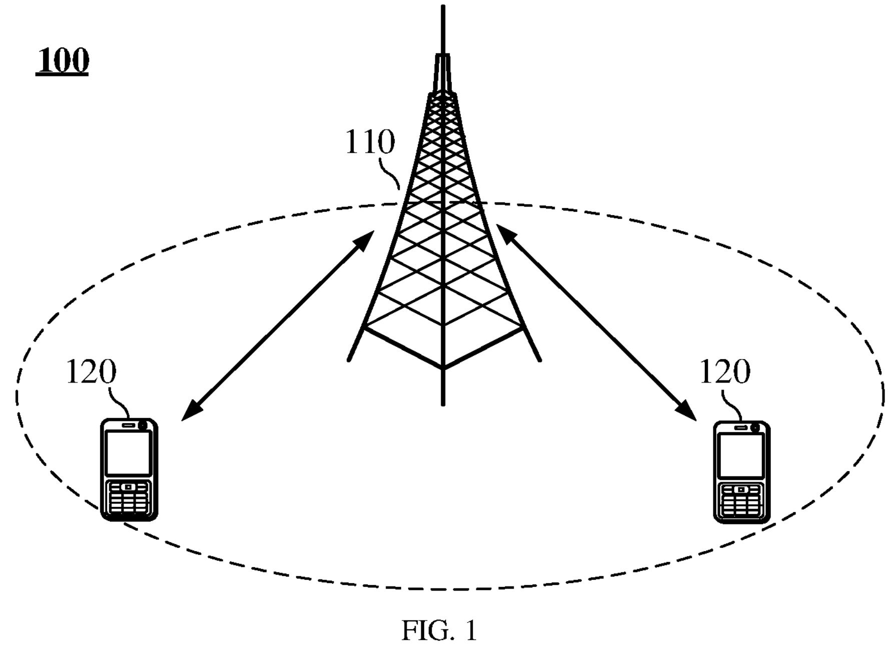
FIG. 1 is a schematic diagram of an application scenario according to an embodiment of the present disclosure.

The technical solutions in embodiments of the present disclosure will be described below with reference to the accompanying drawings in embodiments of the present disclosure.

The technical solutions of embodiments of the present disclosure may be applied to various communication systems, such as a Global System of Mobile (GSM) communication system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an NR system evolution system, a LTE-based access to unlicensed spectrum (LTE-U) system, an NR-based access to unlicensed spectrum (NR-U) system, a Universal Mobile Telecommunications System (UMTS), a Wireless Local Area Network (WLAN), Wireless Fidelity (WiFi), a next generation communication (5th-Generation, 5G) system, or other communication systems Generally speaking, the number of connections supported by a traditional communication system is limited and easy to implement. However, with development of the communication technology, mobile communication systems will not only support traditional communication, but also support, for example, Device to Device (D2D) communication, Machine to Machine (M2M) communication, Machine Type Communication (MTC), or Vehicle to Vehicle (V2V) communication. Embodiments of the present disclosure may also be applied to such communication systems.

Optionally, the communication system in embodiments of the present disclosure may be applied to a Carrier Aggregation (CA) scenario, a Dual Connectivity (DC) scenario, or a Standalone (SA) scenario.

The spectrum to which embodiments of the present disclosure are applied is not limited. For example, embodiments of the present disclosure may be applied to a licensed spectrum, or an unlicensed spectrum.

Embodiments of the present disclosure describe various implementations in combination with a network device and a terminal device. Herein, the terminal device may also be referred to as User Equipment (UE), an access terminal, a subscriber unit, a subscriber station, a mobile station, a rover station, a remote station, a remote terminal, a mobile device, a user terminal, a terminal, a wireless communication device, a user agent, or a user device, etc. The terminal device may be a station (ST) in the WLAN. Alternatively, the terminal device may be a cellular phone, a cordless phone, a Session Initiation Protocol (SIP) phone, a Wireless Local Loop (WLL) station, a Personal Digital Assistant (PDA), a handheld device or a computing device with a wireless communication function, or other processing devices connected to a wireless moderm, a vehicle-mounted device, a wearable device, or a terminal device in a next generation communication system, such as a terminal device in an NR network or a terminal device in a future evolved Public Land Mobile Network (PLMN).

By way of example and not limitation, in embodiments of the present disclosure, the terminal device may be a wearable device. The wearable device may also be called a wearable intelligent device, which is a general term of wearable devices designed intelligently and developed on daily wear using wearable technology, such as glasses, gloves, a watch, clothing and shoes. The wearable device is a portable device that is worn directly on a body or integrated into a user's clothes or accessories. The wearable device not only is a hardware device, but also implements powerful functions through software support, data interaction and cloud interaction. Generalized wearable intelligent device include a device with full features, a large size, and full or partial functions which may be implemented without relying on a smart phone, for example, a smart watch or smart glasses, as well as a device that is only focused on a certain application function and needs to be cooperated with other devices such as a smart phone, for example, a smart bracelet and a smart jewelry for various physical sign observations.

The network device may be a device for communicating with a mobile device, or may be an Access Point (AP) in the WLAN, or a Base Transceiver Station (BTS) in GSM or CDMA, or may be a NodeB (NB) in WCDMA, or an Evolutional Node B (eNB or eNodeB) in Long Term Evolution (LTE), or a relay station or an access point, or a vehicle-mounted device, a wearable device, a network device (gNB) in the NR network, or a network device in the future evolved PLMN network.

In embodiments of the present disclosure, the network device provides services for a cell, and the terminal device communicates with the network device through transmission resources (e.g., frequency domain resources or spectrum resources) used by the cell. The cell may be a cell corresponding to the network device (e.g., a base station). The cell may belong to a macro base station, or may belong to a base station corresponding to a Small cell which here may include a Metro cell, a Micro cell, a Pico cell, a Femto cell, etc. These small cells have features of small coverage and low transmission power, and are suitable for providing high-speed data transmission services.

FIG. 1 exemplarily illustrates one network device 110 and two terminal devices 120. Optionally, the wireless communication system 100 may include multiple network devices 100, and the number of terminal devices included within the coverage area of each network device 110 may be different, which is not limited in embodiments of the present disclosure.

Optionally, the wireless communication system 100 may also include other network entities such as a Mobility Management Entity (MME), an Access and Mobility Management Function (AMF), which is not limited in embodiments of the present disclosure.

It should be understood that the terms "system" and "network" herein may often be interchanged herein. The term "and/or" herein only indicates an association relationship that describes associated objects, and represents that there may be three relationships. For example, A and/or B may represent that: A exists alone, A and B exist simultaneously, and B exists alone. In addition, the character "I" herein generally indicates that proceeding and following objects associated thereby are in an "or" relationship.

Figure 2:
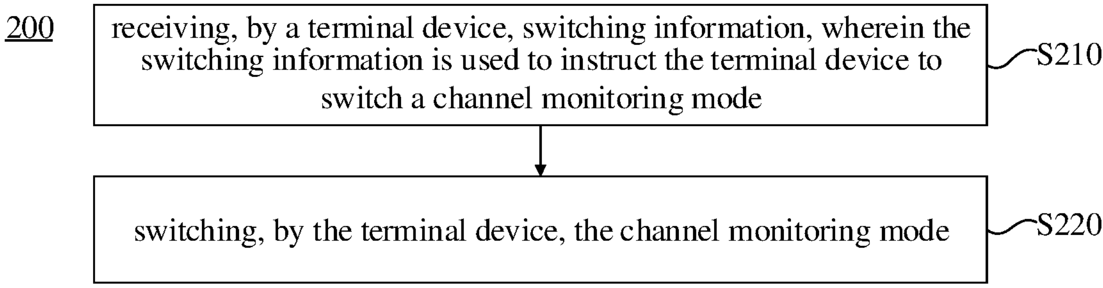
FIG. 2 is a schematic flowchart of a switching method according to an embodiment of the present disclosure.

FIG. 2 is a schematic flowchart of a switching method 200 according to an embodiment of the present disclosure. The method can optionally be applied to the system shown in FIG. 1, but is not limited thereto. The method includes at least some of the following content.

In S210, a terminal device receives switching information, and the switching information is used for instructing the terminal device to switch a channel monitoring mode.

In S220, the terminal device switches the channel monitoring mode.

The terminal device has multiple monitoring modes for a channel such as a Physical Downlink Control Channel (PDCCH). If one of the monitoring modes can enable the terminal device to stay in an energy-saving state, the terminal device can be instructed to switch to this monitoring mode through the switching information, so that the terminal device stays in the energy-saving state. It is also possible to instruct the terminal device to switch from this monitoring mode to another monitoring mode through the switching information, so that the terminal device is not in the energy-saving state, for example, in a normal state.

Optionally, in some embodiments of the present disclosure, the receiving, by the terminal device, the switching information includes: receiving, by the terminal device, the switching information in dynamic control signaling from a network device.

Optionally, in some embodiments of the present disclosure, the switching information is indication information with one or more bits.

Optionally, in some embodiments of the present disclosure, the dynamic control signaling is downlink control information (DCI). One or more bits in the DCI are used for instructing the terminal device to switch the monitoring mode, so that the terminal device can quickly realize the switching.

Optionally, in some embodiments of the present disclosure, the dynamic control signaling further includes triggering information, and the triggering information is used for triggering the terminal device to start a timer corresponding to the switching information. After the timing of the triggered timer ends, the terminal device switches the channel monitoring mode according to the switching information. For example, when the triggering information is "0", the UE can be triggered to start a timer corresponding to "0" so as to start counting, and after the counting ends, the switching is performed according to the switching information.

Optionally, in some embodiments of the present disclosure, the receiving, by the terminal device, the switching information includes: receiving, by the terminal device, configuration information from a network device, and the switching information included in the configuration information is timer information. The timer information and a monitoring mode to which the timer information is switched may be preconfigured through higher layer signaling such as Radio Resource Control (RRC) signaling. For example, the timer information may include a specific frame number and the like. The UE can switch to a corresponding monitoring mode at the specific frame number.

For example, the switching information may include one piece of timer information. This piece of timer information triggers the terminal device to switch to a monitoring mode, so that the terminal device is in the energy-saving state. Then, the timer information can also be used for triggering the terminal device to switch from this monitoring mode to another monitoring mode, so that the terminal device is not in the energy-saving state.

For another example, the switching information may include two pieces of timer information. One piece of timer information triggers the switching, and the other triggers switching backoff. The two pieces of timer information may be the same or different.

Optionally, in some embodiments of the present disclosure, the switching information is further used for instructing the terminal device to switch a scheduling minimum offset value. That is, the switching information may simultaneously instruct the terminal device to switch the monitoring mode and the scheduling minimum offset value. Two indications may also be included in the switching information, one instructing the terminal device to switch the monitoring mode, and the other instructing the terminal device to switch the scheduling minimum offset value. In addition, switching of the monitoring mode and switching of the scheduling minimum offset value can be independently configured. Even if the set scheduling minimum offset value remains unchanged, switching of the monitoring mode such as a monitoring period of the PDCCH is not affected. The scheduling minimum offset value may be a minimum offset value between a downlink control channel and a downlink data channel scheduled by the downlink control channel. For example, the scheduling minimum offset value may be a minimum offset value between a slot where the PDCCH is located and a slot where a PDSCH scheduled by the PDCCH is located.

For example, the PDCCH may configured to be detected periodically. However, the UE does not detect data scheduling on most of PDCCH monitoring occasions, but the UE needs to buffer data after the PDCCH. Upon cross-slot scheduling, the UE avoids the buffering after monitoring the PDCCH, and can immediately turn off a radio frequency module after monitoring the PDCCH. k0 represents an offset value between a slot where the PDCCH is located and a slot where a scheduled Physical Downlink Shared Channel (PDSCH) is located.

Figure 3A:
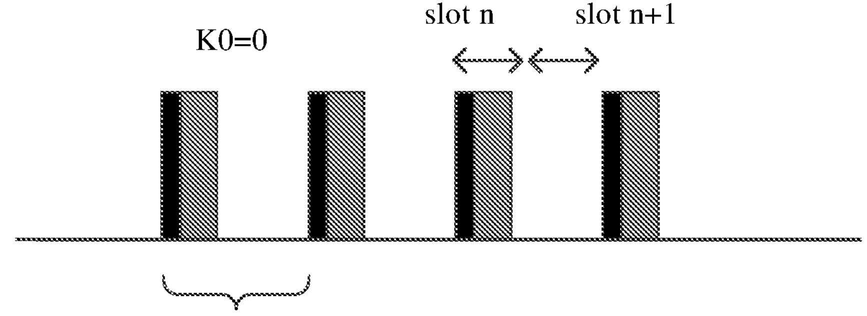
FIG. 3*a* and FIG. 3*b* are schematic diagrams of scheduling minimum offset value switching.

As shown in FIG. 3*a*, the PDCCH monitoring period is two slots. In a case of k0=0, when the PDCCH monitoring period is reached, the buffering is required even if there is no scheduling. Within slot n (the n-th slot), the black part represents that the UE is monitoring the PDCCH. After monitoring the PDCCH, the gray part represents that a radio frequency part cannot sleep and needs to be buffered. The PDCCH is not monitored in slot n+1 (the (n+1)-th slot).

Figure 3B:
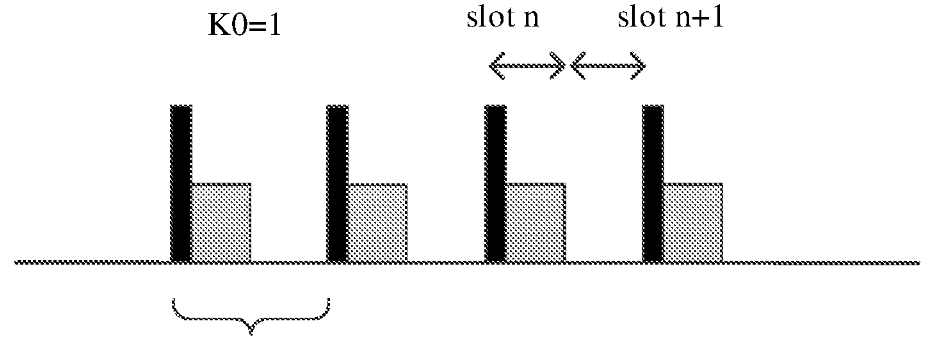

As shown in FIG. 3*b*, in a case of k0=1, a cross-slot scheduling stage is entered. At slot n+1, a time for processing the PDCCH is slowed down by one slot. The gray part represents that the radio frequency part can sleep. Compared with the case in FIG. 3*a*, power consumption is significantly reduced.

The network device can notify the terminal device to enter a cross-slot scheduling state. For example, the terminal device is notified to enter the cross-slot scheduling state through the PDCCH. In the cross-slot scheduling state, the terminal device assumes that a k0 value given by each network device scheduling is greater than a scheduling minimum offset value (minimum k0 value). The minimum k0 value may be preconfigured for the terminal device by the network device.

In some embodiments of the present disclosure, multiple minimum k0 values are preconfigured for the terminal device by the network device. For example, the minimum k0 value is 0 or 1. When the current minimum k0 value is 0, the minimum k0 value can be switched to 1 after the switching information is received. When the current minimum k0 value is 1, the minimum k0 value can be switched to 0 after the switching information is received. If the minimum k0 value is set to be more than two values, multiple bits may be used for indication. For example, two bits can respectively indicate switching to a respective minimum k0 value through 00, 01, 10, and 11.

After the cross-carrier/cross-slot scheduling switching, the minimum k0 value can be adjusted and the PDCCH monitoring period can be adjusted accordingly through the switching information. After the UE receives the switching information scheduled across slots, the UE does not need to perform PDCCH monitoring in each slot, but performs the PDCCH monitoring according to the adjusted monitoring period. If a time span of cross-slot scheduling is long, the UE can completely turn off downlink reception in some subframes to better achieve the energy saving.

Optionally, in some embodiments of the present disclosure, the switching, by the terminal device, the channel monitoring mode includes: switching, by the terminal device, a monitoring mode for a search space of a PDCCH.

Figure 4A:
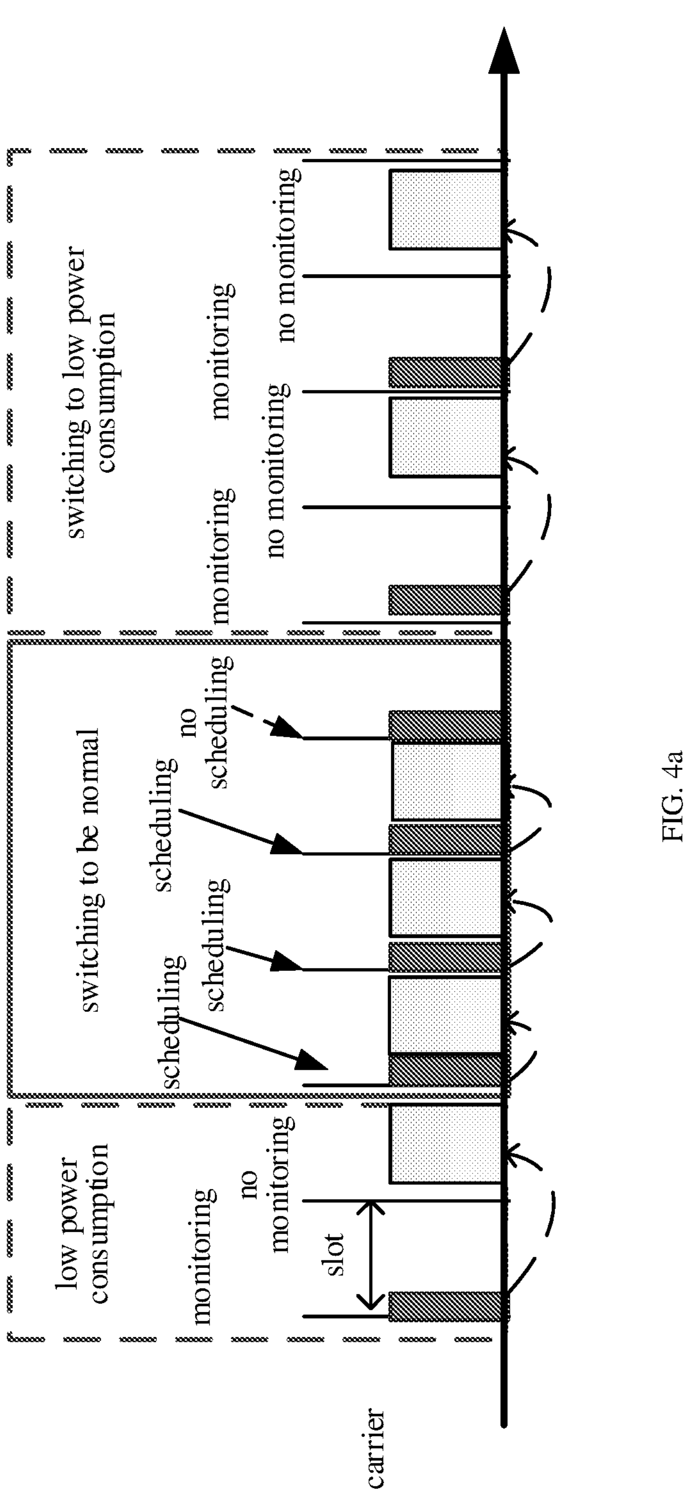
FIG. 4*a* is a schematic diagram of cross-slot scheduling.

For example, the search space of the PDCCH may include UE-special search space (USS). The UE can switch the monitoring mode of the USS. As shown in FIG. 4*a*, the black box indicates that the UE is monitoring the control channel PDCCH, and the gray box indicates that the UE receives data scheduled by the control channel. The UE is in a low power consumption state on a carrier. For example, the UE is in the low power consumption state upon cross-slot or lengthening the monitoring period, which may also be referred to as a sleep state. Through the dynamic control signaling on the carrier, such as the DCI of the PDCCH, the UE can be triggered to switch from the sleep state to the normal state, and the DCI can also schedule the data. The DCI can also trigger the UE to switch from the normal state to the sleep state.

Specifically, the UE triggers the switching of different monitoring modes for the search space by receiving one or more bits in the dynamic control signaling sent by the network device, for example through measures such as: switching to a different search space set group; reconfiguring a monitoring period of the search space set; multiplying the monitoring period of the search space set by a coefficient; and/or determining a PDCCH ignoring duration by the configured scheduling minimum offset value, such as the minimum k0 value.

These monitoring modes for the search space are introduced separately below.

Optionally, in some embodiments of the present disclosure, the switching, by the terminal device, the monitoring mode for the search space of the PDCCH includes: switching, by the terminal device, to a different search space set group. In this way, the terminal device can switch between at least two search space set groups with independently configured monitoring periods.

Optionally, in some embodiments of the present disclosure, the switching, by the terminal device, to the different search space set group includes: in a case where a first search space set group is switched to by the terminal device, switching, by the terminal device, to a first state; and in a case where a second search space set group is switched to by the terminal device, switching, by the terminal device, to a second state, where monitoring periods of the first search space set group and the second search space set group are independently configured, and power consumption of the terminal device in the first state is different from power consumption of the terminal device in the second state.

For example, the first search space set group includes M search space sets, the second search space set group includes N search space sets, and the monitoring period of each search space set group is independently configured. The monitoring periods of the M search space sets in the first search space set group are 2 slots, and the monitoring periods of the N search space sets in the second search space set group are 3 slots. The power consumption of the UE in the second state after switching to the second search space set group is lower than the power consumption of the UE in the first state after switching to the first search space set group.

For example, the first search space set group includes two search space sets, the second search space set group includes three search space sets, and the monitoring period of each search space set group is independently configured. The monitoring periods of the two search space sets in the first search space set group are 2 and 3 slots, respectively. The monitoring periods of the three search space sets in the second search space set group are 2, 3, and 4 slots, respectively. The power consumption of the UE in the second state after switching to the second search space set group is lower than the power consumption of the UE in the first state after switching to the first search space set group.

Optionally, in some embodiments of the present disclosure, the switching, by the terminal device, the monitoring mode for the search space of the PDCCH includes: reconfiguring, by the terminal device, a monitoring period of a search space set. Multiple values can be preconfigured for the monitoring period of the search space set. After receiving the switching information, the terminal device can switch from the current value to another value.

Optionally, in some embodiments of the present disclosure, the reconfiguring, by the terminal device, the monitoring period of the search space set includes: in a case where the monitoring period of the search space set is reconfigured to a first value by the terminal device, switching, by the terminal device, to a first state; and in a case where the monitoring period of the search space set is reconfigured to a second value by the terminal device, switching, by the terminal device, to a second state, where power consumption of the terminal device in the first state is different from power consumption of the terminal device in the second state.

For example, preconfigured values of the monitoring period are set to 1 slot and 2 slots. The current monitoring period of the UE is one slot, and the UE is in the first state. After receiving the switching information, the UE switches the monitoring period to 2 slots, and the UE is in the second state. After the switching information is received again, the monitoring period can also be switched to one slot, and the UE is in the first state. In this case, the power consumption in the second state is lower than the power consumption in the first state, and switching to the second state can reduce the power consumption and better save the energy.

If the preconfigured values of the monitoring period are set to be more than two values, multiple bits can also be used for indication. For example, two bits may respectively indicate switching the monitoring period to the respective preconfigured value through 00, 01, 10, and 11.

Optionally, in some embodiments of the present disclosure, the switching, by the terminal device, the monitoring mode for the search space of the PDCCH includes: multiplying, by the terminal device, a monitoring period of a search space set by a coefficient.

Optionally, in some embodiments of the present disclosure, the multiplying, by the terminal device, the monitoring period of the search space set by the coefficient includes: in a case where the monitoring period of the search space set is multiplied by a first coefficient by the terminal device, switching, by the terminal device, to a first state; and in a case where the monitoring period of the search space set is multiplied by a second coefficient by the terminal device, switching, by the terminal device, to a second state, where the first coefficient has a value greater than 1, the second coefficient is 1, and power consumption of the terminal device in the first state is different from power consumption of the terminal device in the second state.

For example, values of the coefficient for the monitoring period are configured to be 1 and 2. The current monitoring period of the UE is the monitoring period multiplied by 1, and the UE is in the first state. After receiving the switching information, the UE switches the monitoring period to the monitoring period multiplied by 2, and the UE is in the second state. After receiving the switching information again, the UE switches the monitoring period to the monitoring period multiplied by 1, and the UE is in the first state.

In this case, the power consumption in the second state is lower than the power consumption in the first state.

If the coefficient for the monitoring period is set to be more than two values, multiple bits can also be used for indication. For example, two bits may respectively indicate switching the monitoring period to the monitoring period multiplied by a respective coefficient through 00, 01, 10, and 11.

Optionally, in some embodiments of the present disclosure, the switching, by the terminal device, the monitoring mode for the search space of the PDCCH further includes: determining, by the terminal device, an ignoring duration of the search space of the PDCCH by using the scheduling minimum offset value, and the ignoring duration is a duration during which monitoring for the search space of the PDCCH is not performed by the terminal device.

Optionally, in some embodiments of the present disclosure, the ignoring duration includes the scheduling minimum offset value of the PDCCH minus N slots, where N is an integer greater than or equal to 1.

For example, the PDCCH ignoring duration is determined through the minimum k0 value activated by switching the cross-slot scheduling state. In this case, when the UE detects the search space of the PDCCH, and after detecting the PDCCH in each slot, the UE will ignore the monitoring occasions for the search space of the PDCCH for a certain duration later. The ignored duration can be minimum k0−N slots, for example, minimum k0−1 slots.

Optionally, in some embodiments of the present disclosure, the determining, by the terminal device, the ignoring duration of the search space of the PDCCH by using the scheduling minimum offset value includes: in a case of cross-carrier or cross-bandwidth part (BWP) switching, obtaining, by the terminal device, the ignoring duration of the search space of the PDCCH by converting a scheduling minimum offset value on a scheduled carrier.

For example, in the case of cross-carrier or cross-BWP switching, the minimum k0 value is configured on the scheduled carrier. The monitoring period of the search space set of the PDCCH is configured on the scheduling carrier. The number of ignored slots (which is determined according to the minimum k0 value) is switched from the scheduled carrier to the scheduling carrier.

Optionally, in some embodiments of the present disclosure, the obtaining, by the terminal device, the ignoring duration of the search space of the PDCCH by converting the scheduling minimum offset value on the scheduled carrier includes: obtaining, by the terminal device, the number of ignored slots for the search space of the PDCCH by using a scheduling minimum offset value of an active BWP on the scheduled carrier, a subcarrier spacing (SCS) coefficient of an active BWP on a scheduling carrier, and a SCS coefficient of the active BWP on the scheduled carrier.

For example, the number of ignored slots can be calculated using the following formula:

$$\text{the number of ignored slots} = f\left(\frac{\min K_{0,scheduled} \times 2^{\mu_{scheudling}}}{2^{\mu_{scheudled}}}\right) - c$$

where $\min K_{0,scheduled}$ is the minimum k0 value of the active BWP on the scheduled carrier, $\mu_{scheduling}$ is the subcarrier spacing (SCS) coefficient of the active BWP on the scheduling carrier, $\mu_{scheduled}$ is the subcarrier spacing (SCS) coefficient of the active BWP on the scheduled carrier, and cis a constant, such as 1, and f( ) is a specific function, such as a round-up function, a round-down function, or other functions.

Figure 4B:
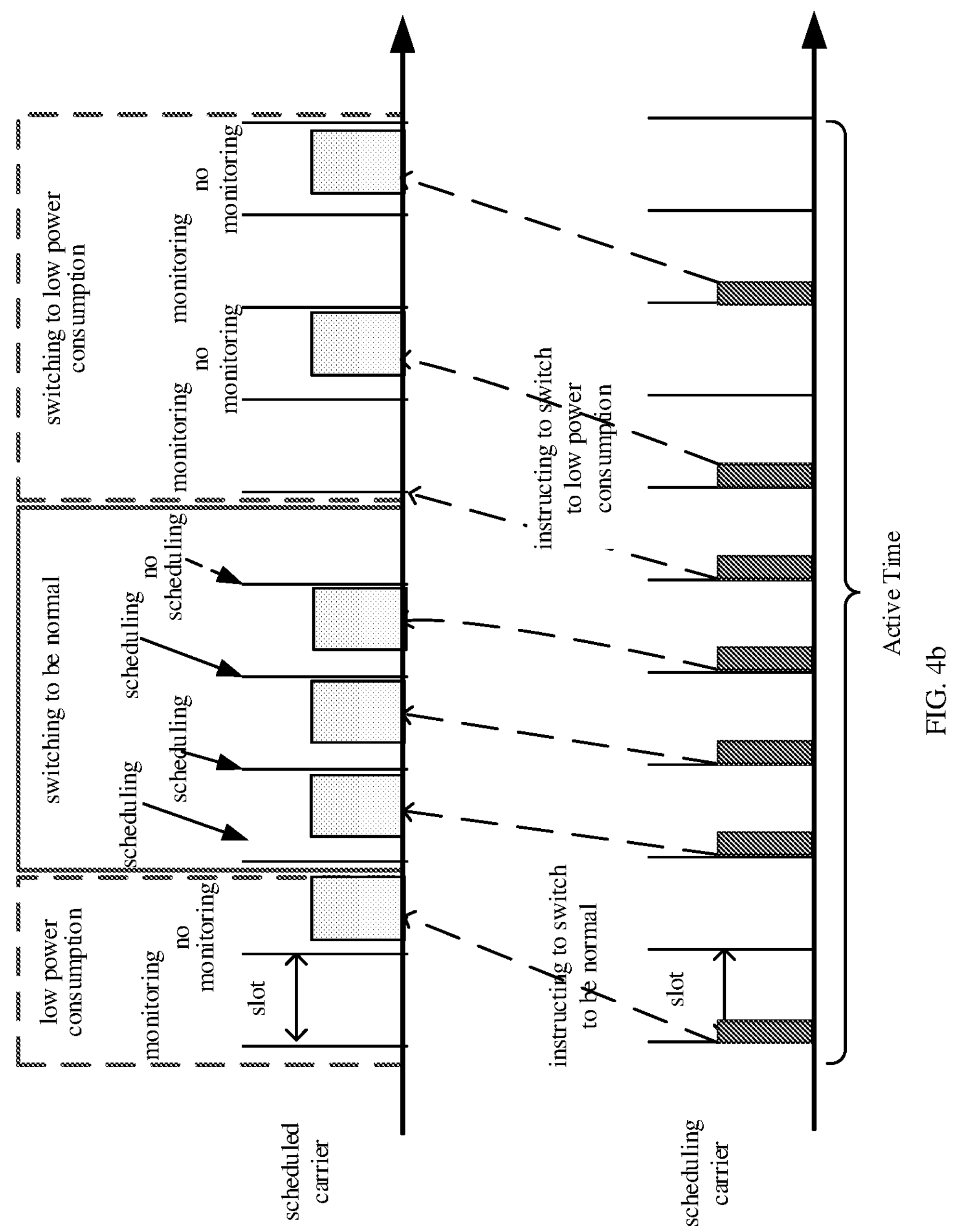
FIG. 4*b* is a schematic diagram of cross-carrier scheduling.

As shown in FIG. 4*b*, in an example, a SCS coefficient ratio is 1, so that slot lengths of the scheduling carrier and the scheduled carrier are the same. During the active time, if the switching information is received, the UE uses the minimum k0 value on the scheduled carrier to calculate the number of ignored slots on the scheduling carrier, and then use the scheduling carrier (also called a primary carrier) as an anchor point, so that some or all of the scheduled carriers (also referred to secondary carriers) enter an energy-saving or non-energy-saving monitoring mode during the active time. If the switching is indicated to be normal on the scheduling carrier, the normal monitoring mode can be switched to at a slot corresponding to the scheduled carrier, and the data can also be scheduled. If the low power consumption is indicated to be switched to on the scheduling carrier, a monitoring mode with low power consumption is switched to at the slot corresponding to the scheduled carrier.

Optionally, in some embodiments of the present disclosure, the switching, by the terminal device, the channel monitoring mode includes: switching, by the terminal device, the number of blind detections of the PDCCH.

Optionally, in some embodiments of the present disclosure, the switching, by the terminal device, the number of blind detections of the PDCCH includes: in a case where the number of blind detections of the PDCCH is reconfigured to be a third value by the terminal device, switching, by the terminal device, to a first state; and in a case where the number of blind detections of the PDCCH is reconfigured to be a fourth value by the terminal device, switching, by the terminal device, to a second state, where power consumption of the terminal device in the first state is different from power consumption of the terminal device in the second state.

For example, preconfigured values of the number of blind detections of the PDCCH are set to be B1 and B2, and B1 is greater than B2. The current number of blind detections of the PDCCH for the UE is B1, and the UE is in the first state. After receiving the switching information, the UE switches the number of blind detections of the PDCCH to be B2, and the UE is in the second state. After the switching information is received again, the number of blind detections of the PDCCH can also be switched to be B2, and the UE is in the first state. In this case, the power consumption of the second state is lower than the power consumption of the first state.

If the preconfigured values of the number of blind detections are set to be more than two values, multiple bits can also be used for indication. For example, two bits may respectively indicate switching the number of blind detections to the respective preconfigured value through 00, 01, 10, and 11.

Optionally, in some embodiments of the present disclosure, the number of blind detections of the PDCCH is determined by a decrement factor or a separate configuration.

Optionally, in some embodiments of the present disclosure, the switching, by the terminal device, the channel monitoring mode includes: switching, by the terminal device, the number of channel estimation resources of the PDCCH.

Optionally, in some embodiments of the present disclosure, the switching, by the terminal device, the number of channel estimation resources of the PDCCH includes: in a case where the number of channel estimation resources of the PDCCH is reconfigured to be a fifth value by the terminal device, switching, by the terminal device, to a first state; and in a case where the number of channel estimation resources of the PDCCH is reconfigured to be a sixth value by the terminal device, switching, by the terminal device, to a second state, where power consumption of the terminal device in the first state is different from power consumption of the terminal device in the second state.

For example, preconfigured values of the number of channel estimation resources of the PDCCH are set to be C1 and C2, and C1 is greater than C2. The current number of channel estimation resources of the PDCCH for the UE is C1, and the UE is in the first state. After receiving the switching information, the UE switches the number of channel estimation resources of the PDCCH to be C2, and the UE is in the second state. After the switching information is received again, the number of channel estimation resources of the PDCCH can also be switched to be C2, and the UE is in the first state. In this case, the power consumption in the second state is lower than the power consumption in the first state.

If the preconfigured values of the number of channel estimation resources are set to be more than two values, multiple bits can also be used for indication. For example, two bits may respectively indicate switching the number of channel estimation resources to the respective preconfigured value through 00, 01, 10, and 11.

Optionally, in some embodiments of the present disclosure, the number of channel estimation resources of the PDCCH is determined by a decrement factor or a separate configuration.

Optionally, in some embodiments of the present disclosure, the switching, by the terminal device, the channel monitoring mode includes: switching, by the terminal device, the number of receiving antennas of the PDCCH.

Optionally, in some embodiments of the present disclosure, the switching, by the terminal device, the channel monitoring mode includes: in a case where the number of receiving antennas of the PDCCH is switched to be a first number of antennas by the terminal device, switching, by the terminal device, to a first state; and in a case where the number of receiving antennas of the PDCCH is switched to be a second number of antennas by the terminal device, switching, by the terminal device, to a second state, where power consumption of the terminal device in the first state is different from power consumption of the terminal device in the second state.

For example, preconfigured values of the number of receiving antennas of the PDCCH are set to be D1 and D2, and D1 is greater than D2. The current number of receiving antennas of the PDCCH of the UE is D1, and the UE is in the first state. After receiving the switching information, the UE switches the number of receiving antennas of the PDCCH to D2, and the UE is in the second state. After the switching information is received again, the number of receiving antennas of the PDCCH can also be switched to D2, and the UE is in the first state. In this case, the power consumption in the second state is lower than the power consumption in the first state.

If the preconfigured values of the number of receiving antennas are set to be more than two values, multiple bits can also be used for indication. For example, two bits may respectively indicate switching the number of receiving antennas to the respective preconfigured value through 00, 01, 10, and 11.

Embodiments of the present disclosure can enable the terminal device to switch the channel monitoring mode more flexibly through the switching information, thereby flexibly controlling an operation state of the terminal device. For example, the terminal device can quickly switch between the energy-saving state or the non-energy-saving state. The indication is achieved through one or more bits in the DCI of the control channel, which can switch the channel monitoring mode more quickly and accurately without increasing the control channel format.

In the related art, the energy-saving state of the carrier where the UE is located is switched by scheduling the control channel, and the UE needs to switch to the energy-saving state only when there is no data. The solutions provided by embodiments of the present disclosure can turn off the scheduling, and use more bits in the control channel to precisely control the sleep energy saving of each secondary carrier. If there is data scheduling, the solutions provided by embodiments of the present disclosure can also be used as scheduling, and the sleep energy-saving state of a secondary carrier group is indicated according to a larger granularity.

In some embodiments of the present disclosure, the network side flexibly triggers the UE side under the multi-carrier configuration to achieve energy saving more finely, without increasing the control channel format.

In some embodiments of the present disclosure, an energy-saving signal on each carrier can also be indicated without introducing a dedicated energy-saving signal. Physical layer signaling overhead of carrier-specific energy-saving signals may be very large due to the large number of carriers. According to embodiments of the present disclosure, no additional bit field of the energy-saving physical layer signal is required.

In some embodiments of the present disclosure, the primary carrier may be used as the anchor point, so that some or all of the secondary carriers enter the energy-saving or non-energy-saving mode during the active time. The response time of energy saving is fast. Moreover, the network device can also quickly trigger the UE to enter the non-energy-saving state with a high data rate through other means, such as a timer.

FIG. 5 is a schematic flowchart of a switching method 300 according to another embodiment of the present disclosure. The method can optionally be applied to the system shown in FIG. 1, but is not limited thereto. The method includes at least some of the following content.

In S310, the network device sends switching information, and the switching information is used for instructing a terminal device to switch a channel monitoring mode.

Optionally, in some embodiments of the present disclosure, the sending, by the network device, the switching information includes: sending, by the network device, dynamic control signaling including the switching information to the terminal device.

Optionally, in some embodiments of the present disclosure, the switching information is indication information with one or more bits. For example, the dynamic control signaling is DCI. One or more bits in the DCI are used for instructing the terminal device to switch the monitoring mode, so that the terminal device can quickly realize the switching.

Optionally, in some embodiments of the present disclosure, the dynamic control signaling further includes triggering information, and the triggering information is used for triggering the terminal device to start a timer corresponding to the switching information.

Optionally, in some embodiments of the present disclosure, the sending, by the network device, the switching information includes: sending, by the network device, configuration information to the terminal device, and timer information included in the configuration information is the switching information. For example, the switching information may include one or more pieces of timer information. The switching and the switching backoff are triggered by the timer information.

Optionally, in some embodiments of the present disclosure, the switching information is further used for instructing the terminal device to switch a scheduling minimum offset value. That is, the switching information may simultaneously instruct the terminal device to switch the monitoring mode and the scheduling minimum offset value. Two indications may also be included in the switching information, one instructing the terminal device to switch the monitoring mode, and the other instructing the terminal device to switch the scheduling minimum offset value. In addition, switching of the monitoring mode and switching of the scheduling minimum offset value can be independently configured. Even if the set scheduling minimum offset value remains unchanged, switching of the monitoring mode such as a monitoring period of the PDCCH is not affected. The scheduling minimum offset value may be a minimum offset value between a downlink control channel and a downlink data channel scheduled by the downlink control channel.

Optionally, in some embodiments of the present disclosure, the switching information is used for instructing the terminal device to switch a monitoring mode for a search space of a physical downlink control channel (PDCCH).

Instructing the terminal device to switch the monitoring mode for the search space of the physical downlink control channel (PDCCH) may include various examples.

In Example 1, the terminal device is instructed to switch to a different search space set group. In this way, the terminal device can switch between at least two search space set groups with independently configured monitoring periods.

After receiving the switching information, the terminal device switches to a different search space set group. For example, in a case where a first search space set group is switched to by the terminal device, the terminal device switches to a first state; and in a case where a second search space set group is switched to by the terminal device, the terminal device switches to a second state. Monitoring periods of the first search space set group and the second search space set group are independently configured, and power consumption of the terminal device in the first state is different from power consumption of the terminal device in the second state.

In Example 2, the terminal device is instructed to reconfigure the monitoring period of the search space set. Multiple values can be preconfigured for the monitoring period of the search space set. After receiving the switching information, the terminal device can switch from the current value to another value.

After receiving the switching information, the terminal device reconfigures the monitoring period of the search space set. For example, in a case where the monitoring period of the search space set is reconfigured to a first value by the terminal device, the terminal device switches to a first state; and in a case where the monitoring period of the search space set is reconfigured to a second value by the terminal device, the terminal device switches to a second state. Power consumption of the terminal device in the first state is different from power consumption of the terminal device in the second state.

In Example 3, the terminal device is instructed to multiply the monitoring period of the search space set by a coefficient. For example, a value of the coefficient can be 1 or a value greater than 1.

After receiving the switching information, the terminal device multiplies the monitoring period of the search space set by the coefficient. For example, in a case where the monitoring period of the search space set is multiplied by a first coefficient by the terminal device, the terminal device switches to a first state; and in a case where the monitoring period of the search space set is multiplied by a second coefficient by the terminal device, the terminal device switches to a second state. The first coefficient has a value greater than 1, the second coefficient is 1, and power consumption of the terminal device in the first state is different from power consumption of the terminal device in the second state.

In Example 4, the terminal device is instructed to determine an ignoring duration of the search space of the PDCCH by using the scheduling minimum offset value, and the ignoring duration is a duration during which monitoring for the search space of the PDCCH is not performed by the terminal device. The ignoring duration may include the scheduling minimum offset value of the PDCCH minus N slots, where N is an integer greater than or equal to 1.

After receiving the switching information, the terminal device uses the scheduling minimum offset value to determine the ignoring duration of the search space of the PDCCH. For example, in a case of cross-carrier or cross-BWP switching, the terminal device obtains the ignoring duration of the search space of the PDCCH by converting a scheduling minimum offset value on a scheduled carrier.

Specifically, the terminal device obtains the number of slots ignored by the search space set of the PDCCH by using a scheduling minimum offset value of an active BWP on the scheduled carrier, a subcarrier spacing (SCS) coefficient of an active BWP on a scheduling carrier, and a SCS coefficient of the active BWP on the scheduled carrier.

Optionally, in some embodiments of the present disclosure, the switching information is used for instructing the terminal device to switch the number of blind detections of the PDCCH.

After receiving the switching information, the terminal device switches the number of blind detections of the PDCCH. For example, in a case where the number of blind detections of the PDCCH is reconfigured to a third value by the terminal device, the terminal device switches to a first state; and in a case where the number of blind detections of the PDCCH is reconfigured to a fourth value by the terminal device, the terminal device switches to a second state. Power consumption of the terminal device in the first state is different from power consumption of the terminal device in the second state.

Optionally, in some embodiments of the present disclosure, the number of blind detections of the PDCCH is determined by a decrement factor or a separate configuration.

Optionally, in some embodiments of the present disclosure, the switching information is used for instructing the terminal device to switch the number of channel estimation resources of the PDCCH.

After receiving the switching information, the terminal device switches the number of channel estimation resources of the PDCCH. For example, in a case where the number of channel estimation resources of the PDCCH is reconfigured to a fifth value by the terminal device, the terminal device switches to a first state; and in a case where the number of channel estimation resources of the PDCCH is reconfigured to a sixth value by the terminal device, the terminal device switches to a second state. Power consumption of the terminal device in the first state is different from power consumption of the terminal device in the second state.

Optionally, in some embodiments of the present disclosure, the number of channel estimation resources of the PDCCH is determined by a decrement factor or a separate configuration.

Optionally, in some embodiments of the present disclosure, the switching information is used for instructing the terminal device to switch the number of receiving antennas of the PDCCH.

After receiving the switching information, the switching, by the terminal device, the channel monitoring mode includes: in a case where the number of receiving antennas is switched to a first number of antennas by the terminal device, switching, by the terminal device, to a first state; and in a case where the number of receiving antennas is switched to a second number of antennas by the terminal device, switching, by the terminal device, to a second state. Power consumption of the terminal device in the first state is different from power consumption of the terminal device in the second state.

For a specific example of the method 300 executed by the network device in an embodiment, reference may be made to the relevant description of the network device in the foregoing method 200, which is not repeated here for brevity.

FIG. 6 is a schematic block diagram of a terminal device 400 according to an embodiment of the present disclosure. The terminal device 400 may include: a receiving unit 410, configured to receive switching information, and the switching information is used for instructing the terminal device to switch a channel monitoring mode; and a switching unit 420, configured to switch the channel monitoring mode.

Optionally, in some embodiments of the present disclosure, the receiving unit 410 is further configured to receive the switching information in dynamic control signaling from a network device.

Optionally, in some embodiments of the present disclosure, the switching information is indication information with one or more bits.

Optionally, in some embodiments of the present disclosure, the dynamic control signaling is downlink control information (DCI).

Optionally, in some embodiments of the present disclosure, the dynamic control signaling further includes triggering information, and the triggering information is used for triggering the terminal device to start a timer corresponding to the switching information.

Optionally, in some embodiments of the present disclosure, the receiving unit 410 is further configured to receive configuration information from a network device, and the switching information included in the configuration information is timer information.

Optionally, in some embodiments of the present disclosure, the switching information is further used for instructing the terminal device to switch a scheduling minimum offset value, and the scheduling minimum offset value may be a minimum offset value between a downlink control channel and a downlink data channel scheduled by the downlink control channel.

Optionally, in some embodiments of the present disclosure, as shown in FIG. 7, the switching unit 420 includes: a first switching subunit 4201, configured to switch a monitoring mode for a search space of a physical downlink control channel (PDCCH).

Optionally, in some embodiments of the present disclosure, the first switching subunit 4201 is further configured to switch to a different search space set group.

Optionally, in some embodiments of the present disclosure, the first switching subunit 4201 is further configured to switch to a first state in a case where a first search space set group is switched to, and switch to a second state in a case where a second search space set group is switched to.

The monitoring periods of the first search space set group and the second search space set group are independently configured, and power consumption of the terminal device in the first state is different from power consumption of the terminal device in the second state.

Optionally, in some embodiments of the present disclosure, the first switching subunit 4201 is further configured to reconfigure a monitoring period of a search space set.

Optionally, in some embodiments of the present disclosure, the first switching subunit 4201 is further configured to switch to a first state in a case where the monitoring period of the search space set is reconfigured to a first value, and switch to a second state in a case where the monitoring period of the search space set is reconfigured to a second value.

Power consumption of the terminal device in the first state is different from power consumption of the terminal device in the second state.

Optionally, in some embodiments of the present disclosure, the first switching subunit 4201 is further configured to multiply a monitoring period of a search space set by a coefficient.

Optionally, in some embodiments of the present disclosure, the first switching subunit 4201 is further configured to switch to a first state in a case where the monitoring period of the search space set is multiplied by a first coefficient, and switch to a second state in a case where the monitoring period of the search space set is multiplied by a second coefficient.

The first coefficient has a value greater than 1, the second coefficient is 1, and power consumption of the terminal device in the first state is different from power consumption of the terminal device in the second state.

Optionally, in some embodiments of the present disclosure, the first switching subunit 4201 is further configured to determine an ignoring duration of the search space of the PDCCH by using the scheduling minimum offset value, and the ignoring duration is a duration during which monitoring for the search space of the PDCCH is not performed by the terminal device.

Optionally, in some embodiments of the present disclosure, the ignoring duration includes the scheduling minimum offset value of the PDCCH minus N slots, where N is an integer greater than or equal to 1.

Optionally, in some embodiments of the present disclosure, the first switching subunit 4201 is further configured to obtain the ignoring duration of the search space of the PDCCH by converting a scheduling minimum offset value on a scheduled carrier, in a case of cross-carrier or cross-bandwidth part (BWP) switching.

Optionally, in some embodiments of the present disclosure, the first switching subunit 4201 is further configured to obtain the number of slots ignored by the search space set of the PDCCH by using a scheduling minimum offset value of an active BWP on the scheduled carrier, a subcarrier spacing (SCS) coefficient of an active BWP on a scheduling carrier, and a SCS coefficient of the active BWP on the scheduled carrier.

Optionally, in some embodiments of the present disclosure, the switching unit 420 further includes: a second switching subunit 4202, configured to switch the number of blind detections of the PDCCH.

Optionally, in some embodiments of the present disclosure, the second switching subunit 4202 is further configured to switch to a first state in a case where the number of blind detections of the PDCCH is reconfigured to a third value, and switch to a second state in a case where the number of blind detections of the PDCCH is reconfigured to a fourth value.

Power consumption of the terminal device in the first state is different from power consumption of the terminal device in the second state.

Optionally, in some embodiments of the present disclosure, the number of blind detections of the PDCCH is determined by a decrement factor or a separate configuration.

Optionally, in some embodiments of the present disclosure, the switching unit 420 further includes: a third switching subunit 4203, configured to switch the number of channel estimation resources of the PDCCH.

Optionally, in some embodiments of the present disclosure, the third switching subunit 4203 is further configured to switch to a first state in a case where the number of channel estimation resources of the PDCCH is reconfigured to a fifth value, and switch to a second state in a case where in a case where the number of channel estimation resources of the PDCCH is reconfigured to a sixth value.

Power consumption of the terminal device in the first state is different from power consumption of the terminal device in the second state.

Optionally, in some embodiments of the present disclosure, the number of channel estimation resources of the PDCCH is determined by a decrement factor or a separate configuration.

Optionally, in some embodiments of the present disclosure, the switching unit 420 further includes: a fourth switching subunit 4204, configured to switch the number of receiving antennas of the PDCCH.

Optionally, in some embodiments of the present disclosure, the fourth switching subunit 4204 is further configured to switch to a first state in a case where the number of receiving antennas is switched to a first number of antennas, and switch to a second state in a case where the number of receiving antennas is switched to a second number of antennas.

Power consumption of the terminal device in the first state is different from power consumption of the terminal device in the second state.

It should be understood that the abovementioned and other operations and/or functions of each unit in the terminal device according to some embodiments of the present disclosure are to implement the respective flows executed by the terminal device in the method 200 in FIG. 2, respectively and will not be repeated here for brevity.

FIG. 8 is a schematic block diagram of a network device 500 according to an embodiment of the present disclosure. The network device can include: a sending unit 510, configured to send switching information, and the switching information is used for instructing a terminal device to switch a channel monitoring mode.

Optionally, in some embodiments of the present disclosure, the sending unit 510 is further configured to send dynamic control signaling including the switching information to the terminal device.

Optionally, in some embodiments of the present disclosure, the switching information is indication information with one or more bits.

Optionally, in some embodiments of the present disclosure, the dynamic control signaling is DCI.

Optionally, in some embodiments of the present disclosure, the dynamic control signaling further includes triggering information, and the triggering information is used for triggering the terminal device to start a timer corresponding to the switching information.

Optionally, in some embodiments of the present disclosure, the sending unit 510 is further configured to send configuration information to the terminal device, and the timer information included in the configuration information is the switching information.

Optionally, in some embodiments of the present disclosure, the switching information is further used for instructing the terminal device to switch a scheduling minimum offset value, and the scheduling minimum offset value may be a minimum offset value between a downlink control channel and a downlink data channel scheduled by the downlink control channel.

Optionally, in some embodiments of the present disclosure, the switching information is used for instructing the terminal device to switch a monitoring mode for a search space of a physical downlink control channel (PDCCH).

Optionally, in some embodiments of the present disclosure, the switching information is used for instructing the terminal device to switch the number of blind detections of the PDCCH.

Optionally, in some embodiments of the present disclosure, the number of blind detections of the PDCCH is determined by a decrement factor or a separate configuration.

Optionally, in some embodiments of the present disclosure, the switching information is used for instructing the terminal device to switch the number of channel estimation resources of the PDCCH.

Optionally, in some embodiments of the present disclosure, the number of channel estimation resources of the PDCCH is determined by a decrement factor or a separate configuration.

Optionally, in some embodiments of the present disclosure, the switching information is used for instructing the terminal device to switch the number of receiving antennas of the PDCCH.

It should be understood that the abovementioned and other operations and/or functions of each unit in the network device according to some embodiments of the present disclosure are to implement the respective flows executed by the network device in the method 300 in FIG. 5, respectively and will not be repeated here for brevity.

Figure 9:
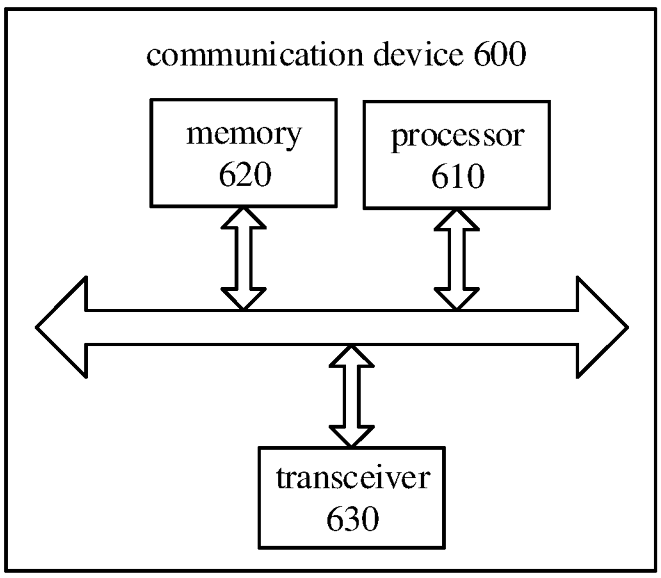
FIG. 9 is a schematic block diagram of a communication device according to an embodiment of the present disclosure.

FIG. 9 is a schematic block diagram illustrating a communication device 600 according to an embodiment of the present disclosure. The communication device 600 shown in FIG. 6 includes a processor 610. The processor 610 may call a computer program from a memory and run the computer program, to implement the method in embodiments of the present disclosure.

Optionally, as shown in FIG. 9, the communication device 600 may further include a memory 620. The processor 610 may call the computer program from the memory 620 and run the computer program, to implement the method in embodiments of the present disclosure.

The memory 620 may be a component independent of the processor 610, or may be integrated into the processor 610.

Optionally, as shown in FIG. 9, the communication device 600 may further include a transceiver 630. The processor 610 may control the transceiver 630 to communicate with another device. Specifically, the transceiver 630 may transmit information or data to another device, or receive information or data transmitted by another device.

The transceiver 630 may include a transmitter and a receiver. The transceiver 630 may further include an antenna. There may be one or more antennas.

Optionally, the communication device 600 may be the network device in embodiments of the present disclosure, and the communication device 600 can implement respective procedures implemented by the network device in various methods according to embodiments of the present disclosure. For brevity, details are not described herein again.

Optionally, the communication device 600 may be the terminal device in embodiments of the present disclosure, and the communication device 600 can implement respective procedures implemented by the terminal device in various methods according to embodiments of the present disclosure. For brevity, details are not described herein again.

Figure 10:
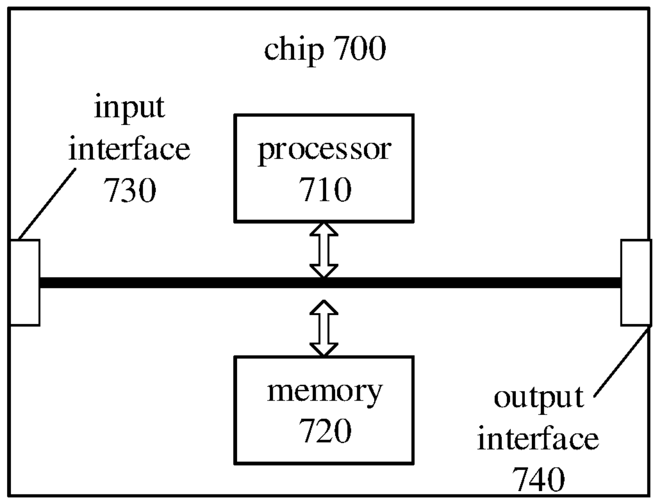
FIG. 10 is a schematic block diagram of a chip according to an embodiment of the present disclosure.

FIG. 10 is a schematic block diagram of a chip 700 according to an embodiment of the present disclosure. The chip 700 shown in FIG. 10 includes a processor 710 which can call and run a computer program from a memory to implement the method according to embodiments of the present disclosure.

Optionally, as shown in FIG. 10, the chip 700 can further include a memory 720. The processor 710 can call and run the computer program from the memory 720 to carry out the method in embodiments of the present disclosure.

The memory 720 can be a separate device independent of the processor 710, or can be integrated in the processor 710.

Optionally, the chip 700 can further include an input interface 730. The processor 710 can control the input interface 730 to communicate with other devices or chips, and specifically, to obtain information or data transmitted by other devices or chips.

Optionally, the chip 700 can further include an output interface 740. The processor 710 can control the output interface 740 to communicate with other devices or chips, and specifically, to output information or data to other devices or chips.

Optionally, the chip can be applied to the network device in embodiments of the application, and the chip can carry out the respective processes which are implemented by the network device in the method according to embodiments of the present disclosure, which will not be repeated here for the sake of brevity.

Optionally, the chip can be applied to the terminal device in embodiments of the present disclosure, and the chip can carry out the respective processes which are implemented by the terminal device in the method according to embodiments of the present disclosure, which will not be repeated here for the sake of brevity.

It should be understood that the chip mentioned in embodiments of the present disclosure can also be referred to as a system-level chip, a system chip, a chip system, or a system-on-chip.

The foregoing processor can be a general-purpose processor, a Digital Signal Processor (DSP), a Field Programmable Gate Array (FPGA), an Application Specific Integrated Circuit (ASIC), other programmable logic devices, transistor logic device, or a discrete hardware component. The foregoing general-purpose processor can be a microprocessor, any conventional processor or the like.

The foregoing memory may be a volatile memory or a non-volatile memory, or may include both volatile and non-volatile memories. The non-volatile memory can be a Read-Only Memory (ROM), a Programmable ROM (PROM), an erasable PROM (EPROM), an electrically EPROM (EEPROM) or a flash memory. The volatile memory may be a Random Access Memory (RAM).

It should be understood that the foregoing description of the memory is exemplary rather than limiting. For example, the memory in embodiments of the present disclosure can also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch-Link DRAM (SLDRAM), a Direct Rambus RAM (DR RAM), among others. That is to say, the memory in embodiments of the present disclosure is intended to include but is not limited to those and any other suitable types of memories.

Figure 11:
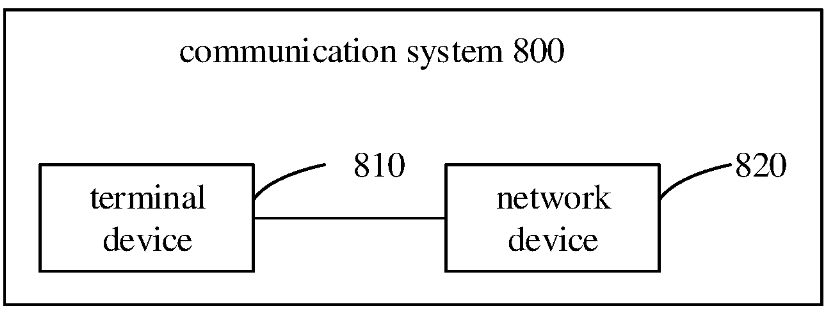
FIG. 11 is a schematic block diagram of a communication system according to an embodiment of the present disclosure.

FIG. 11 is a schematic block diagram of a communication system 800 according to an embodiment of the present disclosure. As shown in FIG. 11, the communication system 800 includes a terminal device 810 and a network device 820.

The network device is configured to send switching information, and the switching information is used for instructing the terminal device to switch a channel monitoring mode.

The terminal device receives the switching information and switches the channel monitoring mode.

The terminal device 810 can be used for implementing the corresponding functions implemented by the terminal device in the above method 200, and the composition of the terminal device 810 may be as shown in the terminal device 400 in the above embodiments. The network device 820 can be used for implementing the corresponding functions implemented by the network device in the above method 300, and the composition of the network device 820 may be as shown in the network device 500 in the above embodiments, which will not be repeated here for the sake of brevity.

In the above embodiments, all or part of the functions described in embodiments of the disclosure may be realized through software, hardware or any combination thereof. During implementation with the software, the embodiments may be implemented completely or partially in form of computer program product. The computer program product includes one or more computer instructions. When the computer program instruction is loaded and executed on a computer, the flows or functions according to embodiments of the disclosure are completely or partially generated. The computer may be a universal computer, a dedicated computer, a computer network or another programmable device. The computer instruction may be stored in a computer-readable storage medium or transmitted from one computer-readable storage medium to another computer-readable storage medium. For example, the computer instruction may be transmitted from a website, computer, server or data center to another website, computer, server or data center in a wired (for example, coaxial cable, optical fiber and Digital Subscriber Line (DSL)) or wireless (for example, infrared, wireless and microwave) way. The computer-readable storage medium may be any available medium accessible to the computer or a data storage device, such as a server and a data center, including one or more integrated available media. The available medium may be a magnetic medium (for example, a floppy disk, a hard disk and a magnetic tape), an optical medium (for example, a Digital Video Disc (DVD)), a semiconductor medium (for example, a Solid State Disk (SSD)) or the like.

It can be appreciated that, in various embodiments of the present disclosure, the values of the sequence numbers of the above processes does not mean the order in which they are performed. The order in which the respective processes are to be performed should be determined by their functions and internal logics, and should not constitute any limitation on the implementations of embodiments of the present disclosure.

A person skilled in the art may clearly understand that, for simple and clear description, with regard to specific work processes of the foregoing described system, device, and unit, reference may be made to corresponding process in the foregoing method embodiments, and details are not described herein again.

Described above are merely specific implementations of the present disclosure, but the protection scope of the present disclosure is not limited thereto. Changes or replacements readily figured out by any person skilled in the art within the technical scope disclosed in the present disclosure shall be covered by the protection scope of the present disclosure. Therefore, the protection scope of the present disclosure shall be subject to the protection scope of the claims.

What is claimed is:

1. A switching method, comprising:

receiving, by a terminal device, switching information, wherein the switching information is used for instructing the terminal device to switch a channel monitoring mode; and switching, by the terminal device, the channel monitoring mode, wherein the receiving, by the terminal device, the switching information comprises:

receiving, by the terminal device, the switching information in dynamic control signaling from a network device;

wherein the dynamic control signaling is downlink control information (DCI);

wherein the switching, by the terminal device, the channel monitoring mode comprises:

switching, by the terminal device, a monitoring mode for a search space of a physical downlink control channel (PDCCH);

wherein the switching of different monitoring modes for the search space of the PDCCH is triggered by the terminal device receiving one or more bits in the dynamic control signaling;

wherein the terminal device is configured with a first search space set group and a second search space set group;

wherein the switching, by the terminal device, the monitoring mode for the search space of the PDCCH comprises switching between the first search space set group and the second search space set group;

wherein the first search space set group comprises M search space sets, the second search space set group comprises N search space sets, and monitoring periods of the first search space set group and the second search space set group are individually configured, where M and N are positive integers larger than one; and wherein power consumption of the terminal device in a first state corresponding to the first search space set group is different from power consumption of the terminal device in a second state corresponding to the second search space set group.

2. The method according to claim 1, wherein the switching information is indication information with one or more bits.

3. The method according to claim 1, wherein the switching information is further used for instructing the terminal device to switch a scheduling minimum offset value, and the scheduling minimum offset value is a minimum offset value between a downlink control channel and a downlink data channel scheduled by the downlink control channel.

4. The method according to claim 1, wherein the switching, by the terminal device, the monitoring mode for the search space of the PDCCH, comprises:

switching, by the terminal device, the monitoring mode for the search space of the PDCCH from a first monitoring mode to a second monitoring mode.

5. The method according to claim 4, wherein at least one piece of monitoring mode information corresponding to the first monitoring mode is different from the monitoring mode information corresponding to the second monitoring mode, the monitoring mode information comprising:

the search space set group;

the monitoring period of the search space set group;

a coefficient for the monitoring period of the search space set group; and/or an ignoring duration, during which monitoring of the search space of the PDCCH is not performed by the terminal device.

6. The method according to claim 4, wherein the second monitoring mode comprises a monitoring mode where monitoring of the search space of the PDCCH is not performed during the ignoring duration.

7. The method according to claim 6, wherein the ignoring duration occurs after detecting the PDCCH.

8. The method according to claim 6, wherein the ignoring duration comprises one or more slots.

9. The method according to claim 6, wherein the ignoring duration is determined by the terminal device based on a scheduling minimum offset value.

10. The method according to claim 3, wherein the switching, by the terminal device, the monitoring mode for the search space of the PDCCH further comprises:

determining, by the terminal device, an ignoring duration of the search space of the PDCCH by using the scheduling minimum offset value, wherein the ignoring duration is a duration during which monitoring of the search space of the PDCCH is not performed by the terminal device.

11. The method according to claim 10, wherein the determining, by the terminal device, the ignoring duration of the search space of the PDCCH by using the scheduling minimum offset value comprises:

in a case of cross-carrier or cross-bandwidth part (BWP) switching, obtaining, by the terminal device, the ignoring duration of the search space of the PDCCH by converting the scheduling minimum offset value on a scheduled carrier.

12. The method according to claim 11, wherein the obtaining, by the terminal device, the ignoring duration of the search space of the PDCCH by converting the scheduling minimum offset value on the scheduled carrier comprises:

obtaining, by the terminal device, the number of slots ignored by the search space set of the PDCCH by using the scheduling minimum offset value of an active BWP on the scheduled carrier, a subcarrier spacing (SCS) coefficient of an active BWP on a scheduling carrier, and a SCS coefficient of the active BWP on the scheduled carrier.

13. The method according to claim 1, wherein the PDCCH is configured to schedule data.

14. A switching method, comprising:

sending, by a network device, switching information, wherein the switching information is used for instructing a terminal device to switch a channel monitoring mode, wherein the sending, by the network device, the switching information comprises:

sending, by the network device, dynamic control signaling comprising the switching information to the terminal device;

wherein the dynamic control signaling is downlink control information (DCI);

wherein the switching information is used for instructing the terminal device to switch a monitoring mode for a search space of a physical downlink control channel (PDCCH);

wherein the switching of different monitoring modes for the search space of the PDCCH is triggered by the terminal device receiving one or more bits in the dynamic control signaling;

wherein the terminal device is configured with a first search space set group and a second search space set group;

wherein the switching, by the terminal device, the monitoring mode for the search space of the PDCCH comprises switching between the first search space set group and the second search space set group;

wherein the first search space set group comprises M search space sets, the second search space set group comprises N search space sets, and monitoring periods of the first search space set group and the second search space set group are individually configured, where M and N are positive integers larger than one; and wherein power consumption of the terminal device in a first state corresponding to the first search space set group is different from power consumption of the terminal device in a second state corresponding to the second search space set group.

15. The method according to claim 14, wherein the switching information is indication information with one or more bits.

16. The method according to claim 14, wherein the switching information is further used for instructing the terminal device to switch a scheduling minimum offset value, and the scheduling minimum offset value is a minimum offset value between a downlink control channel and a downlink data channel scheduled by the downlink control channel.

17. The method according to claim 14, wherein the PDCCH is configured to schedule data.

18. A terminal device, comprising: a processor, a transceiver, and a memory, wherein the memory is configured to store a computer program, and the processor is configured to call and run the computer program stored in the memory and control the transceiver, to perform a switching method, comprising:

receiving switching information, wherein the switching information is used for instructing the terminal device to switch a channel monitoring mode; and switching, by the terminal device, the channel monitoring mode, wherein the receiving, by the terminal device, the switching information comprises:

receiving, by the terminal device, the switching information in dynamic control signaling from a network device;

wherein the dynamic control signaling is downlink control information (DCI);

wherein the switching, by the terminal device, the channel monitoring mode comprises:

switching, by the terminal device, a monitoring mode for a search space of a physical downlink control channel (PDCCH);

wherein the switching of different monitoring modes for the search space of the PDCCH is triggered by the terminal device receiving one or more bits in the dynamic control signaling;

wherein the terminal device is configured with a first search space set group and a second search space set group;

wherein the switching, by the terminal device, the monitoring mode for the search space of the PDCCH comprises switching between the first search space set group and the second search space set group;

wherein the first search space set group comprises M search space sets, the second search space set group comprises N search space sets, and monitoring periods of the first search space set group and the second search space set group are individually configured, where M and N are positive integers larger than one; and wherein power consumption of the terminal device in a first state corresponding to the first search space set group is different from power consumption of the terminal device in a second state corresponding to the second search space set group.

19. A network device, comprising: a processor, a transceiver, and a memory, wherein the memory is configured to store a computer program, and the processor is configured to call and run the computer program stored in the memory and control the transceiver, to perform a switching method, comprising:

sending switching information, wherein the switching information is used for instructing a terminal device to switch a channel monitoring mode, wherein the sending, by the network device, the switching information comprises:

sending, by the network device, dynamic control signaling comprising the switching information to the terminal device;

wherein the dynamic control signaling is downlink control information (DCI);

wherein the switching information is used for instructing the terminal device to switch a monitoring mode for a search space of a physical downlink control channel (PDCCH);

wherein the switching of different monitoring modes for the search space of the PDCCH is triggered by the terminal device receiving one or more bits in the dynamic control signaling;

wherein the terminal device is configured with a first search space set group and a second search space set group;

wherein the switching, by the terminal device, the monitoring mode for the search space of the PDCCH comprises switching between the first search space set group and the second search space set group;

wherein the first search space set group comprises M search space sets, the second search space set group comprises N search space sets, and monitoring periods of the first search space set group and the second search space set group are individually configured, where M and N are positive integers larger than one; and wherein power consumption of the terminal device in a first state corresponding to the first search space set group is different from power consumption of the terminal device in a second state corresponding to the second search space set group.

* * * * *